United States Patent [19]

Couchman, Jr.

[11] 3,827,307
[45] Aug. 6, 1974

[54] DRAG DEVICE FOR BENDIX-TYPE ROPE STARTERS

[75] Inventor: Robert Couchman, Jr., Menomonee Falls, Wis.

[73] Assignee: Briggs & Stratton Corporation, Wauwatosa, Wis.

[22] Filed: July 12, 1973

[21] Appl. No.: 378,435

[52] U.S. Cl. .................. 74/6, 123/185 BA, 188/83, 192/36, 192/94
[51] Int. Cl. .......................... F02n 3/02, F16d 41/00
[58] Field of Search ...... 192/36, 42, 94; 123/185 A, 123/185 B, 185 BA; 188/83; 74/6

[56] References Cited
UNITED STATES PATENTS

| | | | |
|---|---|---|---|
| 3,024,780 | 3/1962 | Hamman | 123/185 BA |
| 3,375,813 | 4/1968 | Hamman | 123/185 A |
| 3,739,763 | 6/1973 | Berry et al. | 123/185 BA |
| 3,754,543 | 8/1973 | Harkness | 123/185 B |

*Primary Examiner*—Allan D. Herrmann

[57] ABSTRACT

A drag device for retarding rotation of the driving clutch element of a Bendix-type engine starter comprises a friction member having jaw portions embracing said clutch element under converging bias and jaw actuating arm portions projecting radially to one side of said element. An elongated friction relieving element has at one end a highly eccentric cam lengthwise confined between the jaw actuating arms. Its other end is confined against orbital motion about the clutch axis. Orbital motion of the arms due to excessive friction angularly displaces the friction relieving member to cam the arms apart, thus diverging the jaws to relieve friction.

6 Claims, 4 Drawing Figures

DRAG DEVICE FOR BENDIX-TYPE ROPE STARTERS

This invention relates generally to rewind pull-rope starters for small gasoline engines, and is more specifically concerned with improvements in the frictional drag device for the driving clutch element of a so-called Bendix-type rope starter.

Small gasoline engines such as are used for powering lawn mowers are commonly equipped with a pull-rope starter comprising a rope that is drawn off of a pulley around which it is normally coiled to rotate the pulley and thereby impart starting torque to the engine crankshaft through a unidirectional clutch connection between the pulley and the crankshaft. In most such starters a coiled torsion spring connected with the rope pulley is wound up as the rope is pulled and, when tension on the rope is eased after a starting stroke, rotates the pulley in the opposite direction to recoil the rope.

One such rope recoil starter that is enjoying increasing commercial favor incorporates some of the principles of the well-known Bendix electric starter. In it the rope pulley has a helically splined connection with a coaxial driving clutch element. Normally the driving clutch element is spaced from a driven clutch element that is fixed on the engine crankshaft. A drag yoke that is confined against rotation engages the driving clutch element to frictionally retard its rotation during initial rotation of the rope pulley and thereby enable the helically splined connection to be effective in moving the driving clutch element axially into engagement with the driven clutch element. Once the clutch elements are engaged, the helically splined connection constrains the driving clutch element to rotate with the rope pulley so that starting torque is transmitted to the crankshaft through the driven clutch element.

As the engine starts, the operator's release of tension on the pull rope allows the recoil spring to drive the rope pulley in its rewinding direction. During an initial stage of such recoil rotation, the drag yoke again serves to inhibit rotation of the driving clutch element so that the rope pulley can rotate relative to it and enable the helically splined connection to return the driving clutch element to its normal position.

In such a Bendix-type rope starter the drag yoke must merely retard rotation of the driving clutch element, not prevent it, since that clutch element must rotate in unison with the rope pulley both when it is engaged with the driven clutch element and when it has returned to its normal axial position.

A common form of drag yoke comprises a more or less U-shaped clip of resilient wire, the legs of which provide jaws that embrace the driving clutch element. The bight portion of the yoke imposes convergent bias upon the legs whereby they clampingly engage the driving clutch element to exert a certain amount of frictional drag upon it. A link connected between the yoke and a fixed part of the engine prevents the yoke from rotating with the driving clutch element but permits the yoke to have a limited amount of translatory motion so that it can accompany that clutch element in its axial excursions. To cooperate with the link in constraining the yoke to such translatory motion, the driving clutch element has a radially outwardly opening circumferential groove in which the jaw portions of the yoke are guidingly received.

In general a Bendix-type rope starter is very dependable and trouble-free, but it has heretofore had one deficiency that has sometimes been a source of annoyance and even, on occasion, of trouble. An engine on which such a starter is installed is necessarily operated under such conditions that it collects dirt and grime, and a certain amount of this foreign matter inevitably settles in the drag yoke groove in the driving clutch element. Such an accumulation of dirt substantially increases the friction between the yoke jaws and the driving clutch element, both by producing roughness at their zones of contact and by effectively narrowing the groove in which the yoke jaws are seated, so that they tend to fit quite snugly therein.

As pointed out above, when tension on the starter pull rope is relieved, the driving clutch element moves axially back to its normal position during an initial rewinding rotation of the rope pulley and thereafter must rotate with the rope pulley as the rope is being recoiled. After that clutch element is moved back to its normal position, the recoil spring must overcome the friction that the drag yoke exerts upon it, in order to effect rope recoiling rotation of the pulley. Hence the friction produced by the drag yoke should be relatively small, in order to minimize the force that the recoil spring must exert. It should be kept in mind that the rope rewinding force available from the spring is limited, inasmuch as that force is stored in the spring during the starting stroke and is thus added to the force that the operator must exert for cranking the engine.

It has often happened, heretofore, that a dirt accumulation in the yoke jaw groove of the driving clutch element so increased the friction which the drag yoke exerted upon that clutch element that the latter could not be rotated by the recoil spring, or could be rotated only at a rate that recoiled the rope with annoying slowness.

It might be further observed that the friction of the drag yoke is also exerted during cranking of the engine, and notwithstanding that even an excessive friction absorbs relatively little of the total cranking work performed by the operator, it certainly does not ease his labor.

The general object of the present invention is to overcome this previously existing deficiency in Bendix-type rope recoil starters by providing a simple and inexpensive drag device which imposes upon the driving clutch element of such a starter only a limited amount of rotation retarding friction, irrespective of the presence or absence of dirt and the like, and which automatically relieves its friction producing grip on that clutch element whenever the clutch element imparts a certain amount of torque to it.

Thus it can also be said to be the general object of this invention to provide a drag device for a Bendix-type rope starter that operates just as well when the starter mechanism is covered with dirt and grime as it does when new.

It is also an object of this invention to provide a simple and inexpensive drag device of the character described that can be installed as a direct replacement for a heretofore conventional drag yoke, without any need for modifying or reworking other parts of the engine or its starter.

Another and more specific object of this invention is to provide a drag device of the character described that comprises a more or less U-shaped clip or yoke of resilient wire having medial portions of its legs bowed and clampingly embracing the driving clutch element of a Bendix-type rope starter, together with a very simple and inexpensive friction relieving member which can be readily molded of plastic and which cooperates with other portions of the legs of the clip to translate torque forces that said clutch element imposes upon the clip into forces which diverge the legs of the clip and thus relieve their friction producing grip upon that clutch element.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 1:
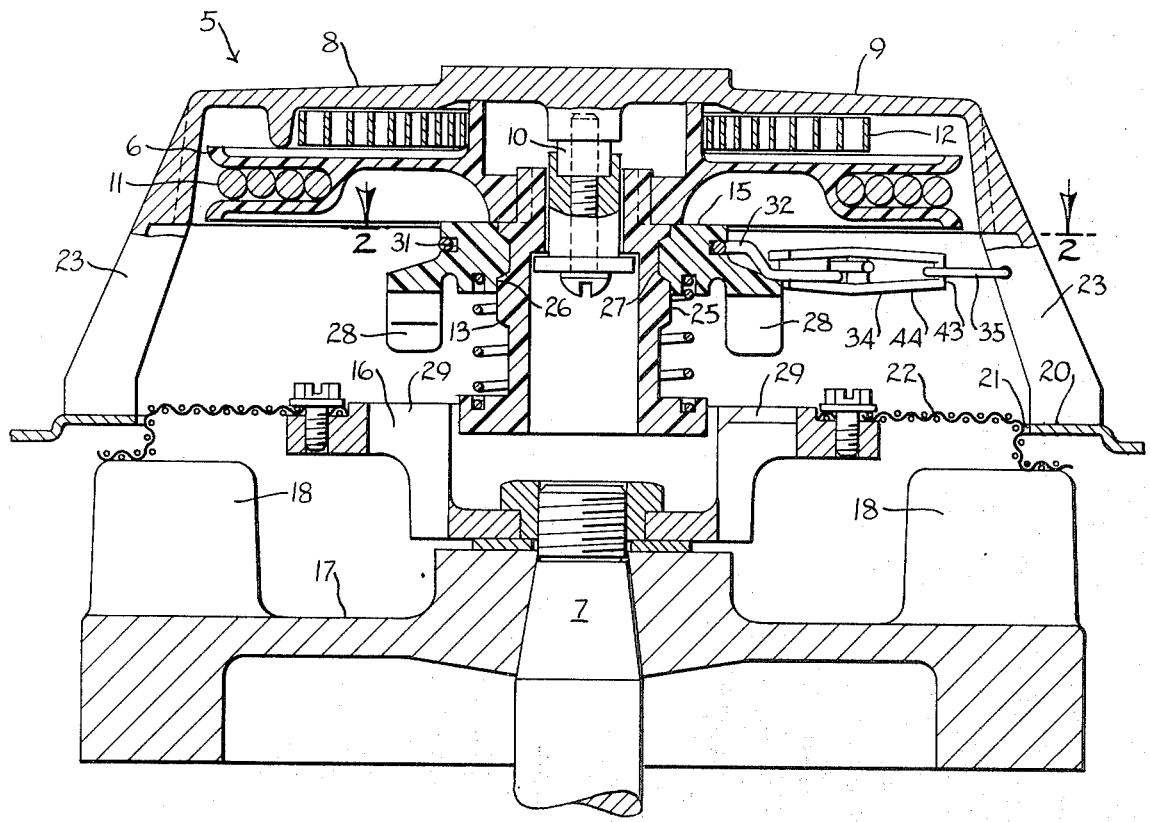
FIG. 1 is a vertical sectional view through a portion of a gasoline engine and a starter therefor that embodies the principles of this invention.
Figure 4:
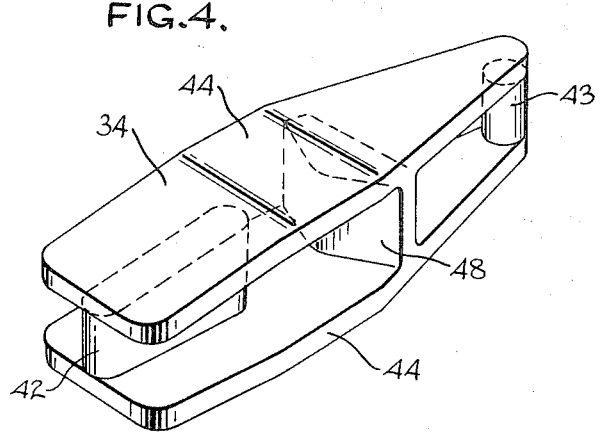
FIG. 4 is a perspective view of the friction relieving member of the drag device.
Figure 2:
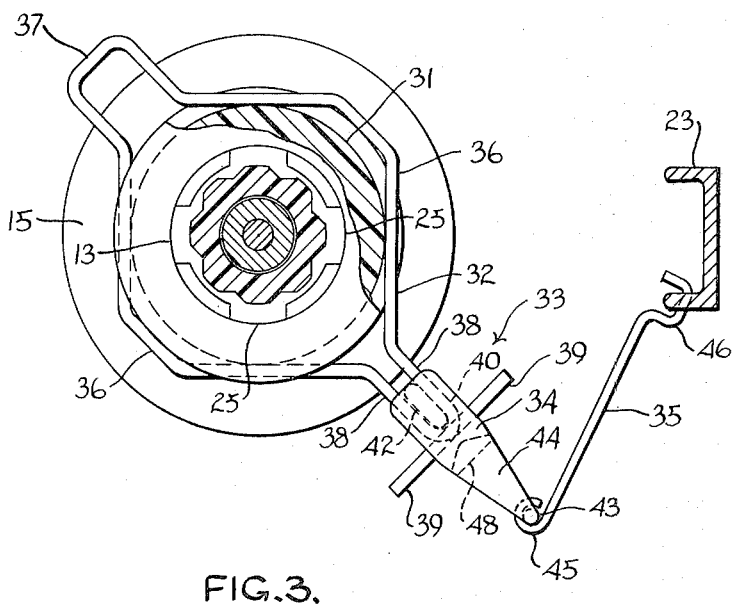
FIG. 2 is a sectional view through the starter, taken on the plane of the line 2—2 in FIG. 1 but showing only the drag device of this invention in its relationship to the driving clutch element of the starter, the drag device being shown in its normal condition in which it imposes frictional drag upon said clutch element.
Figure 3:
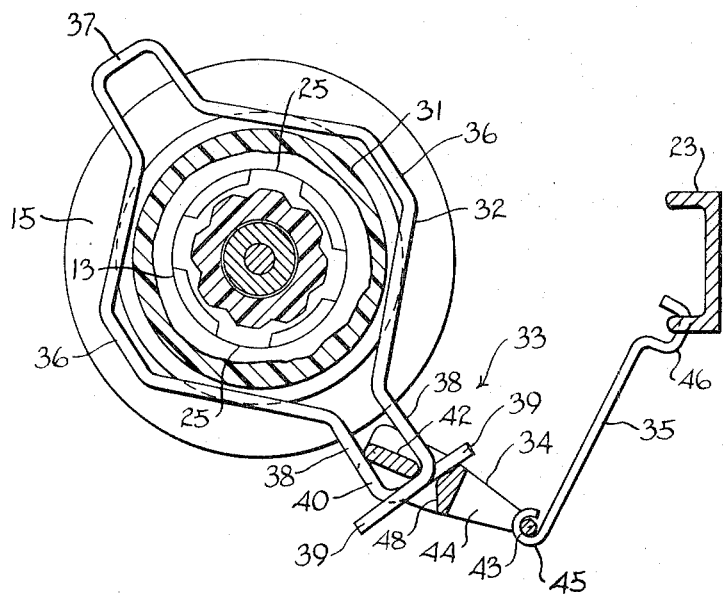
FIG. 3 is a view generally similar to FIG. 2 but showing the drag device in its friction relieving condition.

Referring now to the accompanying drawings, the numeral 5 designates generally a starter for small engines which embodies the principles of this invention and which enables starting torque to be transmitted from a rope pulley 6 to an engine crankshaft 7. As shown, the rope pulley 6 is covered by a shallow cup-shaped or bowl-shaped starter housing 8 that has an end wall 9 which coaxially overlies the end portion of the crankshaft. The rope pulley is freely rotatable on a stub shaft 10 that is carried by the starter housing end wall 9 and projects inwardly therefrom in coaxial relation to the crankshaft. A pull rope 11 that is normally coiled around the pulley 6 and has one end secured thereto extends through an opening in the starter housing to have its other end portion accessible at the exterior thereof.

Edgewise confined between the housing end wall 9 and the rope pulley is a flat, helically coiled rewind spring 12 that has its opposite ends respectively connected with the pulley and the housing. When the rope 11 is drawn out for engine starting, its uncoiling from the pulley imparts rotation thereto in the direction for engine cranking, winding up the spring 12. When the rope is released, the spring unwinds, rotating the pulley in the reverse direction and recoiling the rope back onto it.

At its side opposite the starter housing end wall 9 the rope pulley has a coaxial hub 13 that projects inwardly a substantial distance and has a helically splined connection with a driving clutch element 15. The helically splined connection provides for axial movement of the driving clutch element between a normal position in which it is closely adjacent to the rope pulley proper and an operative position in which it is engaged with a coaxial driven clutch element 16 that is constrained to rotate with the engine crankshaft 7. When the clutch elements 15 and 16 are engaged, the helically splined connection constrains them to rotate with the rope pulley in the engine starting direction.

The driven clutch element 16 is coaxially mounted on a flywheel 17 that is in turn secured to an end portion of the crankshaft 7. As is conventional, the flywheel has blower vanes 18 for forcing cooling air across the engine body when the engine is in operation. A conventional sheet metal blower shroud 20 around the engine body distributes and directs such cooling air. The blower shroud has a large opening 21 that is coaxial with the crankshaft and directly adjacent to the flywheel, through which air can be drawn into the flywheel blower. Although the air inlet opening 21 in the shroud has a screen 22 that prevents entry of grass, leaves and other relatively large pieces of foreign matter, it is not practical to effect complete filtration of the cooling air, and therefore a certain amount of dust and grime is inevitably sucked into the zone adjacent to the starter mechanism and some of it settles on the components of the starter.

The starter housing has legs 23 which extend more or less parallel to the crankshaft axis and which are secured to the shroud 20 around the air opening 21 therein. The legs thus hold the cup-shaped body portion of the starter housing in spaced relation to the shroud, and air can readily flow between them into the opening 21. It will be apparent that the components of the starter mechanism are adequately accessible for repair or replacement, considering that such access to them is rarely necessary, but that any routine cleaning of those parts is out of the question.

Turning now to a more detailed consideration of the parts of the starter mechanism that have a bearing upon the present invention, the rope pulley 6 and its helically splined hub portion 13 are shown as separate parts, molded of a tough, low friction plastic such as nylon and so connected as to be constrained to rotate in unison. The hub portion 13 has helical lands or ribs 25 of relatively coarse pitch that provide the male component of the helically splined connection with the driving clutch element 15.

The female component of that connection is defined by corresponding helical grooves 26 in the surface of a bore 27 through the driving clutch element. The hub portion 13 is received in the bore 27 with an easy fit that enables the driving clutch element to ride on the hub portion for rotation and axial motion relative thereto. The driving clutch element can be molded in one piece, suitably of Delrin.

At circumferentially spaced intervals around the marginal periphery of its front face the driving clutch element has forwardly projecting teeth 28 that are adapted to have torque transmitting engagement with mating teeth 29 on the driven clutch element. The driving clutch element also has a short, coaxial, rearwardly projecting hub-like portion 30 in which there is a radially outwardly opening circumferential groove 31. The groove 31 receives a yoke or clip 32 that comprises the friction member of a drag device 33 of this invention by which rotation of the driving clutch element is retarded. Although the drag device 33 differs in certain important respects from prior drag devices, as described hereinafter, its friction member 32 can be accommodated in the same groove 31 in which the prior drag yoke could be received; and in other respects the drag device of this invention can directly replace its prior art counterpart without requiring changes or modifications in the engine or starter.

In general the drag device 33 comprises, in addition to the more or less U-shaped yoke or friction member 32, a friction relieving member 34 that is connected with the friction member, and a link 35 that provides a connection between the friction relieving member and a fixed part of the engine.

The yoke or friction member 32 can be made from a single piece of resilient wire that has a diameter to be receivable in the groove 31. It is bent to a generally U-shape, with a mirror image symmetry about a longitudinal centerline. The medial portions 36 of the legs of the friction member comprise jaws that are substantially arcuately bent or bowed in opposite directions so that each can extend partway around the hub portion of the driving clutch element, within the groove 31 therein, and so that together they can embrace that hub portion. Since it would not be feasible to produce the jaws 36 with a curvature that would accurately match the periphery of said clutch element, and truly curved jaws could therefore be expected to have only very limited contact with the clutch element, the jaws 36 are so bent that together they define several sides of a polygon, thereby assuring that each jaw will tend to contact the driving clutch element at a plurality of circumferentially spaced zones. Note that the yoke 32 has the jaw portions 36 of its legs spaced a distance from their connecting bight portion 37, so that said bight portion, together with the portions of the legs that extend between it and the jaws 36, serves as a spring that yieldingly urges the jaws into friction producing clamping engagement with the driving clutch element.

Other portions 38 of the legs of the yoke, adjacent to the jaws 36 and remote from the bight 37, comprise jaw actuating arms that extend parallel to one another and are spaced apart by a small distance. With the jaws 36 of the friction member embracing the driving clutch element, the jaw actuating arms 38 project to one side of the clutch element, substantially radially to it.

The tip portions 39 of the wire that comprises the friction member 32 are bent at right angles to the jaw actuating arms 38, with the tip portion that extends from each jaw actuating arm projecting across and beyond the other arm. Hence the tip portions 39 cooperate with the jaw actuating arms 38 to define what is in effect a closed loop 40 at the end of the friction member remote from its bight portion 37.

Substantially all portions of the friction member are coplanar with one another, although, as shown, there can be small offsets in the jaw actuating arms 38, mainly to allow the tip portions 39 to project across one another in laterally contiguous relationship.

The friction relieving member 34 is an elongated part that can be readily molded in one piece. Near one of its ends it has a cam portion 42 that is closely received between the jaw actuating arms 38 of the friction member. This cam portion 42 is markedly eccentric, being elongated lengthwise of the friction relieving member so that normally it is in contact with both jaw actuating arms 38 along substantial portions of their lengths.

Near its other end the friction relieving member has a pin-like connecting portion 43 which is located on the longitudinal centerline of the cam 42 and is spaced a distance from it. This pin 43 serves to connect the friction relieving member to the link 35.

The body of the friction relieving member comprises a pair of elongated wall-like members 44 that are held in flatwise spaced relationship by the cam 42 and the pin 43.

The link 35 can comprise a length of wire that has its end portions bent to form hooks 45 and 46. The hook 45 at one end of the link is a substantially closed eyelet that embraces the pin 43 of the friction relieving member, while the other hook 46 of the link is secured to a fixed part of the engine, as for example to one of the legs 23 of the starter housing. The wall-like members 44 of the friction relieving member, which overlie opposite ends of the pin 43, confine the eyelet hook 45 against displacement off the ends of the pin, and the friction relieving member is thus constrained to swinging motion relative to the link, about the axis defined by the pin.

Similarly, the wall portions 44 project laterally from the cam 42, all around the same, guidingly engaging the jaw actuating arms 38 to confine the friction relieving member to swinging or angular motion relative to the friction member, substantially parallel to the plane thereof and about the axis of the pin 43. To further confine the cam in the loop 40, between the arms 38, the friction relieving member is formed with an integral retaining member 48 extending between its wall-like body portions 44 and transversely to its longitudinal center line, spaced from the cam 42 by a distance such as to prevent the tip portions 39 of the friction member from moving laterally away from the cam.

By reason of the close confinement of the elongated cam 42 between the jaw actuating arms 38 of the friction member, the convergent bias upon those arms urges the friction relieving member towards a normal position in which its longitudinal centerline is between those arms and parallel to them. However, as the driving clutch element rotates, friction between it and the jaws 36 of the friction member imparts torque to the friction member by which its jaw actuating arms 38 tend to be carried orbitally about the clutch axis. Such orbital motion tends to be resisted by the friction relieving member, which, as just explained, is yieldingly restrained against swinging about its pin 43 and has that pin confined against orbital motion by the link 35. However, if the friction becomes high enough so that any substantial orbital movement is imparted to the jaw actuating arms, they of course carry the cam 42 with them, swinging the friction relieving member about its pin 43 and thereby rotating the cam to an orientation in which it is lengthwise oblique to the jaw actuating arms. Such rotation of the cam diverges the arms 38, and consequently the jaws 36, relieving the friction that the jaws impose upon the driving clutch element.

It will be apparent that the operation of the drag relieving member is automatic and is such that the rotation retarding force which the drag device of this invention imposes upon the driving clutch element is self-limiting.

It will be understood that the tip portions 39 of the friction member, which extend behind the cam 42, have substantial length so that even a maximum divergence of the jaw actuating arms will not result in disconnection of the friction member from the friction relieving member.

It will also be evident that there should be a substantially long distance between the cam 42 and the pin 43 in order to afford adequate leverage so that swinging of the friction relieving member about the pin will be translated into a large diverging force exerted by the cam upon the jaw actuating arms 38. To afford overall compactness of the drag device, and also to insure that all orbital motion of the jaw actuating arms is converted into angular motion of the friction relieving member, the point on the fixed engine structure to which the link 35 is connected is so chosen that the link extends substantially at right angles to the length of the friction relieving member.

From the foregoing description taken with the accompanying drawings it will be apparent that this invention provides a friction drag device for retarding rotation of the driving clutch element of a Bendix-type rope starter, which drag device is substantially unaffected by accumulations of dirt and grime on that clutch element and automatically releases or relieves its friction producing grip on that clutch element whenever the drag that it exerts thereon tends to become excessive.

Those skilled in the art will appreciate that the invention can be embodied in forms other than as herein disclosed for purposes of illustration.

The invention is defined by the following claims:

1. In an engine starter wherein a helically splined connection between a drive member and a driving clutch element causes the latter to move axially toward and from engagement with a driven clutch element upon rotation of the drive member relative to the driving clutch element and constrains both clutch elements, when they are engaged, to rotate in one direction with the drive member, friction drag means for retarding rotation of the driving clutch element to provide for its axial movement without materially impeding its rotation with the drive member, said drag means comprising:
    A. a pair of jaw members;
    B. means connecting the jaw members in embracing relationship to the driving clutch element and yieldingly biasing them convergingly towards friction producing engagement with it;
    C. a jaw actuating arm for each jaw member,
        1. said jaw actuating arms being disposed to one side of the driving clutch element to be moved orbitally about it by torque which it frictionally transmits to the jaw members when it rotates,
        2. said jaw actuating arms being parallel to one another and spaced apart, and
        3. each of said arms having a substantially rigid connection with its jaw member whereby lateral divergence of said arms effects divergence of the jaw members;
    D. an elongated friction relieving member having near one end thereof an elongated cam portion that is confined between said jaw actuating arms and is normally in contact with both of them along a substantial part of its length so that rotation of said cam portion relative to said arms effects divergence of the arms; and
    E. means confining the other end of the friction relieving member against motion orbitally about the axis of the driving clutch element so that orbital motion of said jaw actuating arms swings the friction relieving member about its said other end, thus rotating its cam portion relative to said arms.

2. The friction drag means of claim 1, further characterized by:
    F. means on said friction relieving member defining guide surfaces which project laterally from said cam portion and overlie opposite sides of each of said jaw actuating arms to confine the arms to convergent and divergent lateral motion while constraining the cam portion to rotation relative to the arms.

3. The friction drag means of claim 1 wherein a unitary length of resilient wire bent to substantially a U-shape has
    1. the medial portions of its legs oppositely bowed to circumferentially embrace the driving clutch element and provide said jaw members,
    2. its bight portion and other portions of its legs that extend between the bight portion and the jaw members providing said means connecting and convergingly biasing the jaw members,
    3. third portions of its legs that are adjacent to the jaw members and remote from the bight portion providing said jaw actuating arms, and
    4. tip portions of the wire extending laterally from each jaw actuating arm transversely across the other arm to cooperate with said arms in defining a loop remote from the bight portion in which said cam portion of the friction relieving member is received.

4. The friction drag means of claim 3, further characterized by:
    5. means on the friction relieving member defining a surface that opposes said cam portion and is engageable by said tip portions at their sides remote from the cam portion to cooperate with said tip portions in confining said cam portion against displacement out of said loop in directions lengthwise of the jaw actuating arms.

5. In an engine starter wherein a helically splined connection between a rotatable driver and a driving clutch element translates rotation of the driver relative to said clutch element into axial motion of said clutch element between a pair of defined positions, in each of which said connection constrains the clutch element to rotate with the driver, drag means for frictionally retarding rotation of the clutch element without materially impeding its rotation with the driver, said drag means comprising:
    A. a unitary substantially U-shaped yoke of resilient wire
        1. having portions of its legs oppositely bowed to provide jaws that embrace the driving clutch element
        2. the part of the wire that connects said jaw portions serving to convergingly bias said jaws and thus tending to maintain them in friction producing clamping engagement with the driving clutch element, and
        3. other portions of its legs remote from said part of the wire providing jaw actuating arms which are substantially parallel to one another and which can be laterally diverged to relieve such clamping engagement of the jaws, said arms projecting to one side of the clutch element so that rotation of the clutch element tends to move the arms orbitally by reason of said engagement;

B. an elongated friction relieving member having
 1. a cam near one end thereof which is closely received between said arms and which is elongated lengthwise of the friction relieving member to be normally in contact with both of said arms along substantial portions of their lengths but to effect divergence of said arms upon relative angular motion of the friction relieving member substantially parallel to said arms, and
 2. means cooperating with said yoke to confine said cam between the arms and to constrain the friction relieving member to angular motion substantially parallel to said arms; and C. means confining the other end of said friction relieving member against orbital motion about the axis of said clutch element but permitting the first mentioned end of the friction relieving member to swing about said other end thereof as the cam is carried by orbital motion of the arms, thereby enabling said angular motion of the friction relieving member to occur when there is excessive friction between the jaws and said clutch element.

6. The drag means of claim 5 wherein said clutch element has a radially outwardly opening circumferential groove in which the jaws are received, further characterized by:

said means confining the other end of the friction relieving member against orbital motion comprising a link connected between said other end and a fixed part of the starter to permit the yoke and the friction relieving member to accompany said clutch element in its axial movements.

* * * * *